United States Patent [19]
Donahue, Jr.

[11] Patent Number: 5,878,502
[45] Date of Patent: Mar. 9, 1999

[54] APPARATUS AND METHOD FOR COMPARING A GRADE TO A PREDETERMINED SLOPE

[76] Inventor: Harold B. Donahue, Jr., 25 Elm Ridge Rd., Stow, Mass. 01775

[21] Appl. No.: 896,615

[22] Filed: Jul. 18, 1997

[51] Int. Cl.⁶ ............................................. G01C 9/26
[52] U.S. Cl. ......................... 33/374; 33/451; 33/485; 33/521; 33/343
[58] Field of Search .................... 33/1 H, 1 N, 343, 33/365, 369, 374, 375, 376, 379, 451, 452, 479, 484, 485, 521, 526, 533, 534, 624; 35/567, 567.1

[56] References Cited

U.S. PATENT DOCUMENTS

| | | | |
|---|---|---|---|
| 255,778 | 4/1882 | Fisher | 33/375 |
| 265,999 | 10/1882 | Watson | 33/375 |
| 323,351 | 7/1885 | McManus | 33/375 |
| 423,484 | 3/1890 | Martin | 33/381 |
| 479,803 | 8/1892 | Haise | 33/374 |
| 487,375 | 12/1892 | Roberts | 33/381 |
| 1,076,797 | 10/1913 | Sutton | 33/375 |
| 1,199,355 | 9/1916 | Edmiston | 33/451 |
| 1,274,696 | 8/1918 | De Lay . | |
| 1,305,636 | 6/1919 | Weilep . | |
| 1,329,197 | 1/1920 | Matoba | 33/375 |
| 1,410,491 | 3/1922 | Matoba . | |
| 1,520,928 | 12/1924 | Brown et al. | 33/375 |
| 2,162,602 | 6/1939 | Black | 33/375 |
| 2,627,115 | 2/1953 | Pippin | 33/451 |
| 2,743,528 | 5/1956 | Posthauer, Sr. | 33/207 |
| 2,746,164 | 5/1956 | Eitzen | 33/214 |
| 2,753,633 | 7/1956 | Calver | 33/1 |
| 2,915,829 | 12/1959 | Baxter | 33/88 |
| 3,169,324 | 2/1965 | Heinz | 33/206 |
| 3,286,356 | 11/1966 | Johnson | 33/214 |
| 3,751,818 | 8/1973 | Eller, Jr. | 33/375 |
| 3,967,381 | 7/1976 | Chesbro | 33/521 |
| 4,067,117 | 1/1978 | Bernard | 33/375 |
| 4,194,295 | 3/1980 | Simuro et al. | 33/458 |
| 4,228,588 | 10/1980 | Horton, Jr. | 33/1 |
| 4,274,203 | 6/1981 | Vasile | 33/1 |
| 4,327,501 | 5/1982 | Hurt | 33/465 |
| 4,693,011 | 9/1987 | Strayham | 33/451 |
| 4,802,067 | 1/1989 | Ryder et al. | 362/61 |
| 4,862,595 | 9/1989 | Drumright | 33/374 |
| 5,212,890 | 5/1993 | White et al. | 33/451 |

*Primary Examiner*—G. Bradley Bennett
*Attorney, Agent, or Firm*—Hamilton, Brook, Smith & Reynolds, P.C.

[57] ABSTRACT

An apparatus for comparing compliance of a grade to a predetermined slope includes a block and a level. The block has at least one notch positioned at a distance from a first end of the block such that when the method of this invention is practiced, a level indicator will indicate whether a grade on which the apparatus is resting matches a predetermined grade. A method of this invention includes the steps of inserting an arm of predetermined length into the notch and placing the joined block and arm on a grade. A level is placed at the arm to thereby compare compliance of the grade to a predetermine slope.

17 Claims, 2 Drawing Sheets

APPARATUS AND METHOD FOR COMPARING A GRADE TO A PREDETERMINED SLOPE

BACKGROUND OF THE INVENTION

The Americans with Disabilities Act (ADA), as well as state regulations, mandate construction guidelines to facilitate access for disabled individuals. Among these regulations are those that specify the maximum slope of access ramps and that set limitations on the permissible degree of slope in walkways and parking lots. Under the laws enacted in accordance with these regulations, the maximum slope of an access ramp is 1:12, meaning that a ramp cannot elevate more than a foot over a 12-foot horizontal span. Further, a parking lot or walkway should not have a slope of greater than 1:20. I.e., paving may not rise or drop at a ratio of greater than one foot per 20-foot horizontal span.

When constructing building access areas, the slope in each of these areas must be surveyed to ensure that the appropriate regulations are met. Tools generally available for the purpose of determining the slope of a grade, such as surveying equipment, are typically expensive, bulky, and difficult to use.

Therefore, a need exists for an apparatus and method for evaluating the slope of an access area that overcomes or minimizes these problems.

SUMMARY OF THE INVENTION

The present invention is directed to an apparatus and method for comparing a grade to a predetermined slope.

The apparatus includes a block that defines at least one notch. The notch is spaced at a distance from a first end of the block that will cause a level indicator, supported by an arm of predetermined length extending substantially horizontally from the notch, to indicate a horizontal level when the block and arm are placed on a grade matching the predetermined slope. The level indicator is attached to the block. As an alternative to attaching the level indicator to the block, the block and the level indicator may both be included as members of a kit.

The method includes inserting an arm into the notch of a block. A first end of the block and the arm are rested against a grade such that the arm is substantially horizontal and is supported by the block at an end proximal to the block and by the grade at an end distal to the block. A level is placed at the arm to determine whether the grade is in compliance with a predetermined slope.

The apparatus of this invention provides the advantages of being compact, inexpensive, and convenient to use. The method of this invention also provides the advantages of being quick and easy to perform. Preferred embodiments of the invention further provide a previously-unrealized efficiency as the apparatus of this invention is mated with a standard measuring stick, such as a yardstick, to form a complete slope-evaluating instrument. Yardsticks are inexpensive and readily accessible, and most are of standard thickness. Accordingly, any individual would need to purchase only the compact block and level of this invention to practice the claimed method, thereby minimizing cost and surveying expenses. The convenience of the apparatus is further apparent in that the block and level of the apparatus can easily be carried around in one's pocket.

DESCRIPTION OF PREFERRED EMBODIMENTS

The foregoing and other objects, features and advantages of the invention will be apparent from the following, more-particular description of preferred embodiments of the invention, as illustrated in the accompanying figures. The drawings are not necessarily to scale, emphasis instead being placed upon illustrating the principles of the invention.

Figure 1:
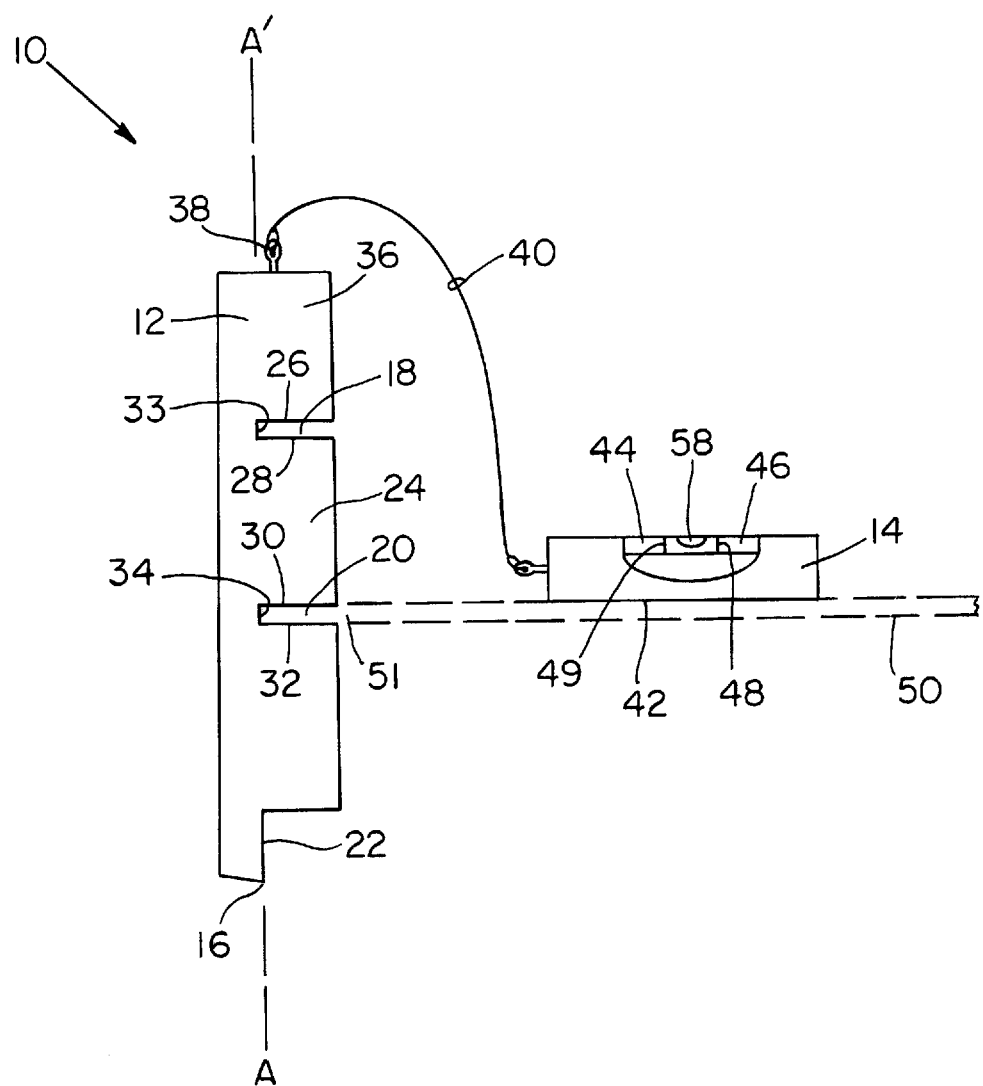
FIG. 1 is a side view of one embodiment of the apparatus for evaluating the slope of a grade.

A preferred embodiment of an apparatus of this invention is illustrated in FIG. 1. Apparatus 10 includes block 12 and attached level 14.

Block 12 includes first end 16. First end 16 serves as a base upon which block 12 can be positioned against a grade. Dado 22 extends from first end 16 to receiving section 24 of block 12. Receiving section 24 defines notches 18 and 20. Notches 18 and 20 are positioned on block 12 at distances from first end 16 to provide predetermined ratios of the length of the measuring stick to the respective distance between first end 16 and each of notches 18 and 20. These predetermined ratios define angles between the notches, the end of the measuring stick, and first end 16, that match slopes against which grades will be evaluated. Notches 18 and 20 are both oriented along respective planes intersected perpendicularly by the major axis A/A' of block 12. It is to be understood, however, that the intersection need not be perpendicular, so long as block 12 supports a standard measuring stick horizontally when first end 16 of block 12 and a distal end of the measuring stick are placed on a grade having a predetermined slope.

Notches 18 and 20 are dimensioned to receive a standard measuring stick, such as a yard stick, for easy mating of block 12 and the measuring stick to jointly form an instrument for evaluating compliance of the slope of a grade. First notch 18 has a substantially uniform width of about 0.15 inches between walls 26 and 28. Likewise, second notch 20 has a substantially uniform width of about 0.15 inches between walls 30 and 32. Seats 33 and 34 of notches 18 and 20, respectively, are flush with the plane of dado 22. The plane of wall 26 of first notch 18 is about 3.0 inches from the extreme tip of first end 16. The plane of wall 30 of second notch 20 is about 1.8 inches from the extreme tip of first end 16. It is to be understood, however, that notches 18, 20 need not be recessed within block 12. For example, arms, not shown, can extend from block 12 to define notches 18, 20. The arms can be integral to block 12 or separate components that can be attached to block 12.

In other embodiments, the dimensions of notches 18 and 20 essentially match the width of arms of other measuring units. For example, one embodiment of block 12 is designed for use with a meter stick. To accommodate the slightly greater length of the meter stick and yet retain the 1:12 and 1:20 slope ratios, the distance between first end 16 and each of notches 18 and 20 is increased by an amount proportionate to the difference in length between the meter stick and yardstick. In this embodiment, notch 18 is about 8.3 cm from first end 16 of block 12, and notch 20 is about 5.0 cm from first end 16. Further, the width, both between wall 26 and wall 28 of notch 18 and between wall 30 and wall 32 of notch 20, is suitable for receiving a typical, commercially-available meter stick and for maintaining a fixed angle between the meter stick and block 12.

In other embodiments of the block, the notches, which may be one or several in count, are positioned at distances from first end 16 to provide ratios of rise:run other than 1:12 and 1:20. Also, the width of the notches need not match that of a standard measuring stick. However, when the notch width does match that of a standard measuring stick, several advantages are provided. First, the block can be readily mated with a measuring tool (i.e., the measuring stick) already in the possession of any individual or readily accessible thereto. Second, compatibility with a standard measuring stick provides for relative certainty and uniformity of dimensions when block 12 is mated with a measuring stick to form a combination tool for evaluating slope. Also, the width of notches 18 and 20 can be made adjustable by a suitable means, such as use of a plastic or elastomeric material to fill any space between the measuring stick and an opposing wall. Block 12 is preferably made of wood, though plastic, metal or other durable material can be used.

At distal end 36 of block 12, ring 38 is threaded into a drilled bore. String 40 is tied to ring 38 at one end of string 40. At the opposite end of string 40, level 14 is attached such that level 14 can be manipulated into positions wherein underside 42 of level 14 can be positioned adjacent to the plane of either of walls 26 and 30 of respective notches 18 and 20. Level 14, which is typically of the compact bubble-type variety commonly available in hardware stores, includes vial 44. Region 46 of vial 44, beyond marker 48, is designated as noncomplying in that, if the bubble settles into noncomplying region 46 when the level is used in accordance with the method of this invention, indication is provided that the grade being evaluated is steeper than a predetermined limit.

Apparatus 10 can be used to measure the slope of a grade, such as an access ramp, parking lot or walkway. Contingent upon the nature of the slope to be evaluated, an arm (typically, a yardstick or other standard measuring device) is inserted into one of notches 18 and 20.

Figure 2:
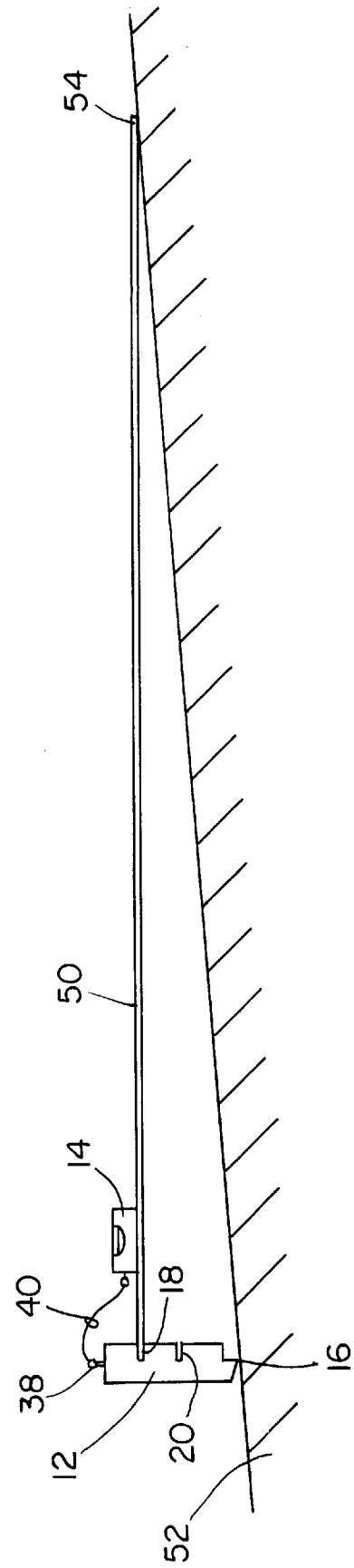
FIG. 2 is a side view illustrating the use of the embodiment shown in FIG. 1 to evaluate the slope of a grade.

In one embodiment, the method of the invention includes inserting proximal end 51 of yardstick 50, shown in FIG. 2, into notch 18 of block 12. Block 12 is poised upon a grade to evaluate compliance of the slope of the grade. First end 16 is downslope from where distal end 54 of yardstick 50 rests against grade 52. With first end 16 of block 12 and distal end 54 of yardstick 50 both resting against grade 52, level 14 is placed against top face 56 of yardstick 50, with bubble 58 facing away from top face 56 such that it may be read to determine compliance or noncompliance with certified grade requirements.

The dimensions of the preferred embodiment of block 12, specified above, provide an approximate 3 inch vertical rise between first end 16 and top face 56 of yardstick 50. The horizontal extension from seat 33 of notch 18 to distal end 54 of yardstick 50 is 36 inches (i.e., the length of the yardstick). Accordingly the ratio of rise:run is approximately 1:12. Therefore, block 12 will be vertically oriented and yardstick 50 will be oriented along a horizontal axis when grade 52 has a matching slope, i.e., 1:12. Because level 14 is parallel with yardstick 50, bubble 58 will be positioned between markers 48 and 49 when the slope of grade 52 matches the rise:run ratio of the united block and yardstick, thereby indicating that level 14 and yardstick 50 are horizontally level (see FIG. 1). If, on the other hand, the slope of grade 52 is greater than 1:12, first end 16 of block 12 will be positioned more than 3 inches below distal end 54 of yardstick 50. As a result, yardstick 50 will slope downward from distal end 54 to notch 18. Given that level 14 lies in a plane parallel to yardstick 50, bubble 58 within vial 44 of level 14 will shift toward distal end 54 of yardstick 50 and into noncomplying region 46, thereby indicating that the grade has a rise:run steeper than the predetermined limit.

EQUIVALENTS

Those skilled in the art will recognize, or be able to ascertain using no more than routine experimentation, many equivalents to the specific embodiments of the invention to be encompassed by the following claims.

The claimed invention is:

1. An apparatus for comparing a grade to a predetermined slope, comprising:

a) a block defining at least one notch, said notch being spaced at a distance from a first end of said block that will cause a level indicator, supported by an arm of predetermined length extending from the notch, to indicate a horizontal level when the block and arm are placed on a grade matching a predetermined slope; and b) a level indicator attached to the block.

2. The apparatus of claim 1, wherein the notch is adapted to receive a yardstick having a thickness of about 0.15 inches.

3. The apparatus of claim 2, wherein the notch is spaced about three inches from the first end of the block.

4. The apparatus of claim 3, further including a second notch, said second notch being spaced about 1.8 inches from said first end of the block.

5. The apparatus of claim 1, wherein the notch is spaced between about 8.3 centimeters from the first end of the block.

6. The apparatus of claim 1, wherein the first end of the block defines a dado.

7. The apparatus of claim 6, wherein a major axis of the block is at a right angle with a major axis of the arm extending from the notch of the block.

8. The apparatus of claim 6, wherein the notch is dimensioned to cause a distal end of the arm of predetermined length extending from the notch, a proximal end of the arm abutting the block, and said first end of the block to define a right triangle.

9. The apparatus of claim 1, wherein the block defines a second notch for receiving the arm, wherein the second notch is positioned about three-fifths of the distance from the first end to the first notch.

10. The apparatus of claim 1, wherein the notch opening is variable, whereby the notch can be adjusted to match the thickness of the arm extending from the block.

11. A kit for comparing a grade to a predetermined slope, comprising:

a) a block defining at least one notch, said notch being spaced at a distance from a first end of said block that will cause a level indicator, supported by an arm of predetermined length extending substantially horizontally from the notch, to indicate a horizontal level when the block and arm are placed on a grade matching a predetermined slope; and b) a level indicator.

12. The kit of claim 11, wherein the notch is adapted to receive a yardstick having a thickness of about 0.15 inches.

13. The kit of claim 12, wherein the block defines a second notch for receiving the arm, wherein the second notch is positioned about three-fifths of the distance from the first end to the first notch.

14. A block for comparing a grade to a predetermined slope, wherein the block defines at least one notch, said notch being spaced about three inches from a first end of said block and for receiving a yardstick having a thickness of about 0.15 inches, whereby a level indicator supported by the yardstick indicates a horizontal level when the block and yardstick are placed on a grade having a 1:12 slope and the yardstick extends substantially horizontally from the notch.

15. The block of claim 14, wherein the first end of the block defines a dado and the notch is dimensioned to cause a distal end of the arm of predetermined length extending from the notch, a proximal end of the arm abutting the block, and said first end of the block to define a right triangle.

16. The block of claim 15, wherein the block defines a second notch for receiving the arm, wherein the second notch is positioned about three-fifths of the distance from the first end to the first notch.

17. A method for comparing a grade to a predetermined slope, comprising the steps of:
   a) inserting an arm into a notch of a block;
   b) resting both a first end of the block and the arm against a grade, whereby the arm is substantially horizontal and supported by the block at an end proximal to the block and by the grade at an end distal to the block; and
   c) placing a level at the arm, said level thereby comparing the grade to a predetermined slope.

* * * * *